United States Patent
Tamba

[19]
[11] Patent Number: 6,079,364
[45] Date of Patent: Jun. 27, 2000

[54] CAT LITTER-TRAY

[75] Inventor: Nagib Gebraeil Tamba, Rome, Italy

[73] Assignees: Paolo Verrecchia, Bologna; a part interest; Silvio Serbassi, Roma, both of Italy; a part interest

[21] Appl. No.: 09/068,813

[22] PCT Filed: Nov. 15, 1995

[86] PCT No.: PCT/IT95/00189

§ 371 Date: Aug. 7, 1998

§ 102(e) Date: Aug. 7, 1998

[87] PCT Pub. No.: WO97/17837

PCT Pub. Date: May 22, 1997

[51] Int. Cl.[7] ............................................. A01K 1/035
[52] U.S. Cl. ........................................... 119/163; 119/165
[58] Field of Search .................................... 119/163, 165

[56] References Cited

U.S. PATENT DOCUMENTS

| | | |
|---|---|---|
| 4,117,555 | 10/1978 | Dennis ..................................... 119/163 |
| 4,593,645 | 6/1986 | Dingler . |
| 4,729,342 | 3/1988 | Loctin ..................................... 119/163 |
| 5,113,801 | 5/1992 | Rotstein et al. . |
| 5,184,575 | 2/1993 | Reinartz .................................. 119/163 |
| 5,211,133 | 5/1993 | Foley . |
| 5,791,288 | 8/1998 | Ehrler ..................................... 119/163 |

FOREIGN PATENT DOCUMENTS

| | | |
|---|---|---|
| 8900398 | 6/1989 | Germany . |
| 9115113 | 10/1991 | WIPO . |
| 9115114 | 10/1991 | WIPO . |

*Primary Examiner*—Robert P. Swiatek
*Attorney, Agent, or Firm*—Pauley Petersen Kinne & Fejer

[57] ABSTRACT

A cat litter-tray for collection and disposal of cat excreta having a tray in which a layer of granules is disposed. A sensor, connected through a delay-timer to a programmer, senses the presence of a cat. The tray includes a door mechanism having a mechanism for hermetic sealing and re-opening of the tray, a water inlet for providing water onto the granules, an air heater for heating granule drying air, a detergent reservoir, a water heating element, and an electric pump for circulating water into the granules through a plurality of nozzles supported on the base of the tray.

18 Claims, 9 Drawing Sheets

CAT LITTER-TRAY

BACKGROUND OF THE INVENTION

1. Field of the Invention

The present invention relates to a litter-tray for cats which, by the quick and easy (if not actually automatic) removal of the cat excreta and the cleaning of the litter-tray itself, drastically reduces the most inconvenient and unpleasant aspect of keeping a cat in the home.

2. Description of Prior Art

As is known, the practice of keeping small domestic animals (such as cats) at home is spreading. As a result, there is a resulting growth in the market for foods and other accessories needed for keeping these small animals, among which is the litter-tray for the collection and disposal of excreta.

Now, however, it is also known that the main obstacle to an even greater spread of the practice is, without doubt, the removal and disposal of the excreta from the litter-tray, together with the cleaning of the latter, which at present requires long, painstaking and unpleasant cleaning operations which must be repeated frequently in order to prevent the cat soiling elsewhere, in case of necessity, because it does not like to use a dirty litter-tray.

In the present technology, the litter-tray usually comprises a simple tray or open box into which a layer of granular material (known as granules) is introduced and onto which the cat satisfies its bodily requirements.

After each use of such a litter-tray by the cat, it is necessary to remove all the soiled granules immediately with a spatula so that the unsoiled granules can continue to be used. The soiled granules must be sealed in a bag to prevent the unpleasant smell from spreading through the home and the bag must be deposited in the garbage collection bins thus adding to the weight of garbage to be removed. The bed of the tray itself must be cleaned and any wet parts dried and fresh granules must be added to replace those removed. The cost of all this cannot be ignored.

Furthermore, after the introduction of dry "crunchy" cat-food which does not deteriorate with prolonged exposure to air at ambient temperature, it has become even more important to clean the tray frequently. This is probably the main argument against leaving the cat alone in the home for more than 24 hours if unpleasant surprises on return are to be avoided.

U.S. Pat. No. 5,211,133 discloses a litter-tray for the collection and disposal of cat excreta comprising a tray or open box in which a layer of granules is deposited, whereby the granules are contained in a removable net of fine mesh smaller than the grain-size of the same granules and having rim handles for its removal by hand, the net being inserted into the tray. Within the granules is also buried a rigid grille of mesh to support the weight of the can and granules. The tray includes a double bottom to collect liquids in which an antifermentative substance such as vinegar can be added.

International Patent Publication WO-A-91/15114 discloses a litter-tray for the collection and disposal of cat excreta comprising a tray in which a layer of granules is deposited and a removable grill having a mesh larger than the grain size of the said granules is buried within the layer of granules. The grill has rim handles to facilitate its removal by hand.

German Patent Publication DE-U-8900398 discloses a litter-tray for the collection and disposal of cat excreta comprising a tray or open box in which a layer of granules is deposited, a sensor for sensing the presence of a cat connected via a delay-timer to a programmer, a door mechanism fitted with a means of hermetic sealing and reopening of the tray under the control of the programmer, an inlet from the water mains to send water on the layer of granules for such length of time as shall be determined by the programmer and a heating element to heat the drying air.

SUMMARY OF THE INVENTION

The object of the present invention is to provide a litter-tray for cats which, according to a manual first embodiment, considerably reduces the inconvenience of removing the solids and liquids excreted by the cat from the granules and, according to a semi-automatic second embodiment, by using a special washing machine allows granule reuse for many times, and according to an automatic third embodiment not only saves the owner of the cat from all unpleasant cleaning operations, thus allowing absences from home of more than 24 hours without having to take the cat along, but also allows the cat excreta to be disposed of in the same way as domestic waste water without adding to the weight which has to be removed by the municipal garbage disposal service, all without disturbing the cat, which can continue to behave as before.

This and other objects of this invention are achieved by a cat-litter tray in accordance with one embodiment in which the granules are contained on a removable net having a mesh smaller than the grain size of the granules and rim handles on a frame allowing it to be removed by hand. The net is inserted into the open tray or box comprising the litter-tray. A rigid though removable grille is buried in the granules, which rigid grille has a larger mesh than the grain size of the granules and also has rim handles on the frame allowing it to be removed manually.

In this way, after the cat has used the litter-tray, the grille need only be lifted by hand to separate the solid excreta from the granules. The solid waste can be disposed of in the WC or sealed into a plastic bag. The frame with the net is then raised with all the granules and rinsed under running water to remove all traces and odors of the liquid excreta. The frame can also be washed at the same time (as can the tray itself when necessary once the liquid excreta which has collected there has been emptied). The net with the washed granules must be dried and the litter-tray reassembled, first placing the net without the granules in the tray, then the grille and, finally, the dried granules.

From the above description, it is clear that the litter-tray can be operated continually with a minimum of two nets, two lots of granules, some granules to top up with, and one grille. According to one embodiment of the present invention, the granules are made from particles of an inert, non-porous (and thus non-absorbing) material, of any shape, but without sharp edges or rough surfaces, preferably spherical or disc-shaped, measuring from 1 to 6 mm in diameter and are denser than water.

The material may be glass, ceramic, porcelain, plastic or stone, etc. In accordance with one semi-automatic embodiment of the litter-tray of this invention, use can be made either of a tray as previously described in connection with the manual embodiment, or a conventional one, or a special tray provided with a double bottom to collect the liquid excreta of the animal, preventing the unpleasant smell from spreading through the home. It is also possible to add in the double bottom of the box some antifermentative additive in order to prevent cat urine decomposition. It will be apparent that when discharging the dirty granules from the box, the user will also empty said double-bottom and rinse it with running water.

In accordance with one embodiment, a "granule washing machine" is provided, connected to a water and power supply as well as a waste-pipe, in which one or more loads of soiled granules are collected and subjected to hot water and detergent washing and subsequent drying.

At the end of this treatment, the granules are ready for further use. It will be apparent that this treatment requires the use of the abovementioned nonporous granules.

The granule washing machine comprises a box equipped with a rear hinged cover allowing the introduction of a perforated bottom basket containing the spoiled granules. After addition of detergent, closing the cover and starting the washing cycle, an electrovalve allows the admittance of water from the mains supply (in order to save time the apparatus may be connected to the hot water supply), up to a predefined level, checked by a sensor. Thereafter, water and granules are subjected to a strong stirring generated by a blade mechanical stirrer or, according to another embodiment of the invention, by a hydraulic pump. On the bottom of the box, a thermostated heating resistance increases the bath temperature up to a complete sterilization thereof. At the end of the washing cycle, a pump discharges the liquid from the washing machine. Then a series of rinsing cycles with hot water under mechanical stirring is started. At the end, a heater fan dries the granules directly in the basket, thereby making them ready for reuse.

It will be apparent that, if the washing machine is designed for use in a position higher than the waste-pipe level, a gravity discharge may be provided without any electropump action. In accordance with a preferred embodiment of the invention, the cover includes an automatic detergent dispenser and a programming board to modify the cycle and/or the physical variables of the cycle itself.

In the automatic embodiment of this invention, the litter-tray, while appearing to the cat as nothing more than the traditional tray containing granules, is in fact a complete domestic appliance with a sensor to detect the cat's presence. After a suitable delay to allow the cat to distance itself so as not to alarm the cat with strange noises, the tray is automatically closed hermetically with a moving cover, and a programmed cleaning cycle is started comprising the admission of water from the mains into a suitable reservoir which may also contain detergent, the heating of the water by an electric-resistance heater to a predetermined temperature set by the program thermostat, pumping the hot contents of the reservoir (filtered to remove impurities) through nozzles in the bed of the tray to spray strong jets onto the same granules which are thus churned up and cleaned of the excreta (both solid and liquid) deposited by the cat, discharging the dirty water from the grille through a waste-pipe, rinsing the granules one or more times according to the program, drying the granules and the tray itself with air heated by an electric resistance heater to a predetermined temperature set by the program thermostat and blown by a fan through other nozzles also in the bed of the said tray, and, finally, reopening the cover ready to await the next use by the cat.

It will be apparent that such a program can control not only the temperature of the washing water and the drying air, but also the regulation of the specific phases of the cycle as well as their relative duration.

Definitively, the litter-tray for the collection and disposal of cat excreta in accordance with one embodiment of this invention comprises a tray or open box into which a layer of granules is introduced, a sensor to detect the presence of the cat, which is connected by a delay-timer to a programmer, a moving cover fitted with a means of sealing the tray hermetically on the command of the programmer, an inlet pipe from the mains water supply, a reservoir containing detergent, a heating element for heating the water to the temperature set by the water thermostat of the programmer, an electric pump to circulate the hot water in water-galleries in the bed of the tray for the duration of the time period set by the programmer and to spray the water in strong jets onto the layer of granules through nozzles supported on the bed of the tray, a dirty-water waste-pipe which can be connected like a normal domestic washing-machine waste-pipe, an electric fan to blow drying air for the duration set by the programmer through the air-galleries also in the bed of the tray and through nozzles supported on the bed of the tray onto the tray itself and the layer of granules, together with an electric element to heat the drying air to the temperature set by the air thermostat of the programmer.

It will be apparent that in such an embodiment, the combined action of the water, any detergent, the heat and mechanical agitation of the granules by the jets will certainly completely dissolve the excreta, both solid and liquid, which can then be disposed of via a domestic waste-pipe as happens with a dish-washer, without any danger of clogging the waste-pipe.

To assist in the breakdown of solid excreta in accordance with a preferred embodiment of the present invention, granules of a quantity of grinding beads about 10–15 mm in diameter are provided, which act as a mill in the turbulence caused by the jets of water.

According to another embodiment of the present invention, the means for hermetically closing and re-opening the moving cover of the tray comprises two opposing lateral guides on the tray in which run the side edges of the cover which is articulated and which is operated by a friction roller driven by an electric motor, and a hollow elastic perimeter gasket fitted to the rim of the tray, which is inflated by the electric fan controlled by the said programmer.

Once the articulated cover has been closed, the elastic gasket is inflated to seal the tray hermetically.

In accordance with one embodiment of this invention, the means of closing and re-opening the moving cover hermetically comprises an electric or pneumatic actuator linking the tray and the cover in such a way as, on the command of the programmer, to rotate the cover about the hinged edge connecting it to the tray against at least one perimeter sealing gasket on the rim of the same tray, the hermetic seal being maintained by at least one electromagnet in the tray interacting with at least one metal plate on the cover.

In accordance with one embodiment of this invention, the solid excreta is eliminated before the washing cycle begins, by separating the solids from the granules by a suitable means of separation and conveying them, according to another embodiment of the present invention, to a hopper which is fitted to the tray. The hopper comprises rotating mincing blades driven by an electric motor to cut up the excreta into small pieces which can be removed without the risk of clogging even a small-bore tube or small hatch opened by the programmer which provided access to the hopper as well as a rotating roller which, located at the lower end of the small hatch, is driven by the electric motor in such a way as to help to push the solid excreta into the same hopper.

In accordance with one embodiment, the preliminary separation of the solid excreta from the granules is obtained by water floatation, where water is admitted to the tray until the surface level is lighter than that of the granules, at the same level as the hatch on the hopper, signalled by a level-sensor in a variant of the present invention. In this way, the solid excreta, being lighter than water, will float to the surface, helped if necessary by a blast of air from the electric fan which shakes up everything and speeds up the transport of the solid excreta to the surface and towards the hopper. For this reason, it is evident that the granules used must be heavier than water.

In substance, however, the means of separation of the solid excreta from the granules comprises, according to one embodiment of the present invention, a level-sensor for the floatation water inside the tray, located higher than the granules at about the height of the hatch of the hopper.

According to one embodiment of the present invention, in order to facilitate the floating of the solid excreta, the water is rendered denser by the addition of salts in solution, e.g. a saturated solution of sodium chloride (NaCl), at the same time as the air is introduced.

According to one embodiment of the present invention, in order to facilitate the transport of the floating solid excreta into the hopper, the tray is fitted with a spatula or rake at the same level as the level-sensor which is as wide as the tray and is moved in guide-rails in the tray by a pneumatic cylinder or an electric motor across the entire surface of the flotation water to the edge of the hopper.

The preliminary separation of the solid excreta from the granules may be obtained mechanically by means of a removable grille having a larger mesh than the grain-size of the granules, which is previously buried below the level of the layer of granules and at an opportune moment is raised through the granules, taking the solid excreta with it, the latter being then moved across the grille towards the hopper by suitable vibrations of the grille. The same vibrations also help any remaining granules to fall through the mesh and facilitate the embedding of the grille in the granules. The same vibration by agitating the granules also facilitates the phases of washing and drying of the granules.

The means of separation of the solid excreta from the granules comprises a rigid grille having a larger mesh than the grain-size of the granules, which is fitted with a vibrator causing it to vibrate in the direction of the hopper, the grille being capable of being moved vertically by at least one pneumatic cylinder controlled by the programmer from a position of being buried in the layer of granules to a position outside the layer.

According to one embodiment of the present invention, the solid excreta separated by the grille are moved towards the hopper by the same grille which is, of necessity, no longer rigid, but rather is flexible and set up as an endless conveyor belt fitted around two small diameter rollers set horizontally at either end of the tray. In this way, the two rollers and the moving grille they support are first buried in the granules. After the cat has used the tray, the rollers and grille are raised as they are, without turning, above the granules, lifting the solid excreta with them. At this point, turning the said rollers in the raised position tips the excreta directly into the hopper.

Definitively, the means of separation of the solid excreta from the granules, according to one embodiment of the present invention comprises a flexible grille having a larger mesh than the grain-size of the granules, which is fitted as an endless conveyor belt around two small-diameter rollers set horizontally at the two ends of the tray involved with the said hopper, one of the rollers being rotatable, towards the hopper by an electric motor controlled by the programmer, and the roller/grille system being capable of being moved vertically by at least one pneumatic cylinder controlled by the programmer from a position of being buried in the layer of granules to a position outside the layer.

The invention will now be described with reference to the attached drawings which show preferred forms of practical embodiments in an illustrative but non-limiting way in the sense that technical, production or technological variants can be derived without exceeding the scope of the present invention. It is further evident that, although reference is made only to litter-trays for cats, the litter-tray can be for any small domestic animal that normally leaves both solid and liquid excreta in litter-trays. Furthermore, it is clear that various odor-and sludge-removal systems could be adapted to allow the litter-tray to be installed in any environment whatsoever, even one very little ventilated. Whenever it is difficult or impossible to connect the littertray up to a domestic waste pipe, an additional tank can be connected to the waste outlet and operate as a chemical WC to collect the excreta. To avoid frightening the animals with the inevitable noises of the washing and drying cycle, the litter-tray can be enclosed in sound damping material and, finally, the granules can be cleaned better by using ultra-sound and microwaves.

BRIEF DESCRIPTION OF THE DRAWINGS

These and other objects and features of this invention will be better understood from the following detailed description taken in conjunction with the drawings wherein.

DETAILED DESCRIPTION OF PREFERRED EMBODIMENTS

Figure 1:
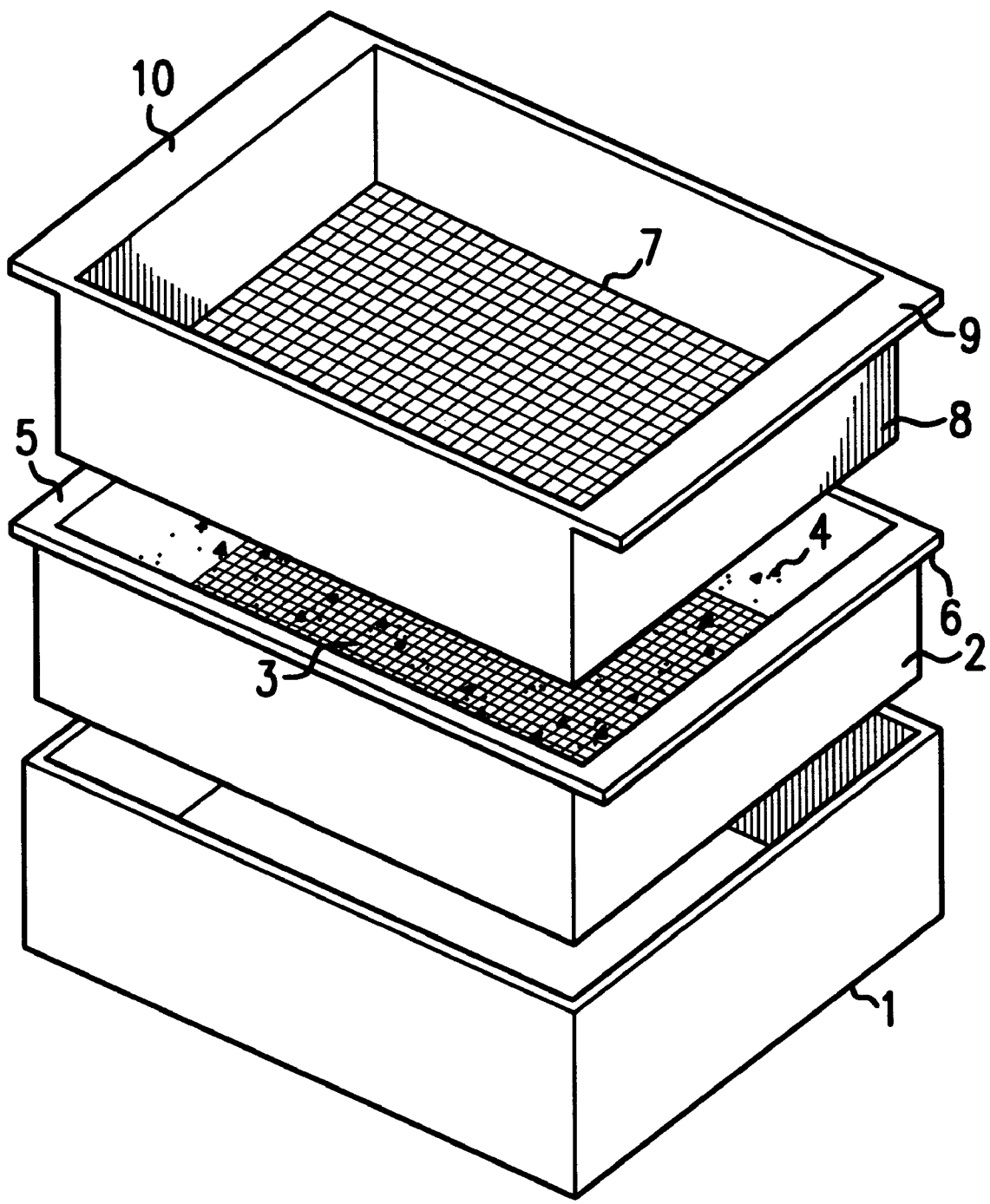
FIG. 1 shows an exploded perspective view of the litter-tray for the collection and disposal of cat excreta, according to the manual embodiment of the present invention.
Figure 2A:
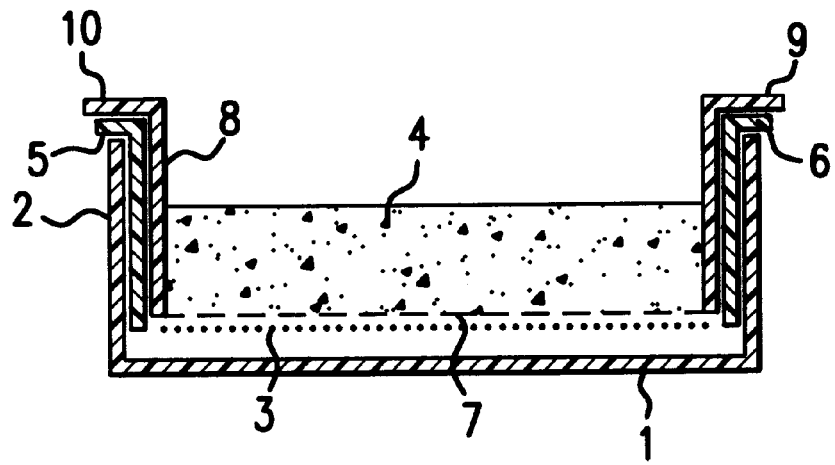
FIG. 2A shows a front cross-section of the litter-tray according to FIG. 1 in operation.

With reference to FIGS. 1 and 2A, a tray or open box 1 comprises the litter-tray for the collection and disposal of cat excreta.

A removable container 2 fits into the tray 1. The container, the floor of which is a grille 3 of fine mesh smaller than the grain-size of the granules 4, has rim handles 5 and 6 for the removal of the same container by hand and contains the said granules 4, an inert nonporous material, in which is buried a rigid grille 7 of coarse mesh larger than the grain size of the granules 4. The rigid grille 7 forms the base of a second container 8 also having rim handles 9 and 10 to facilitate the removal of the same container 8 by hand.

In this way it is sufficient to raise the second container 8 using the handles 9 and 10 to separate the solid excreta from the granules 4. Disposal of the solid excreta thereafter is simple. Container 2 can be extracted and washed completely to eliminate all traces and odors, even of the liquid excreta.

Figure 2B:
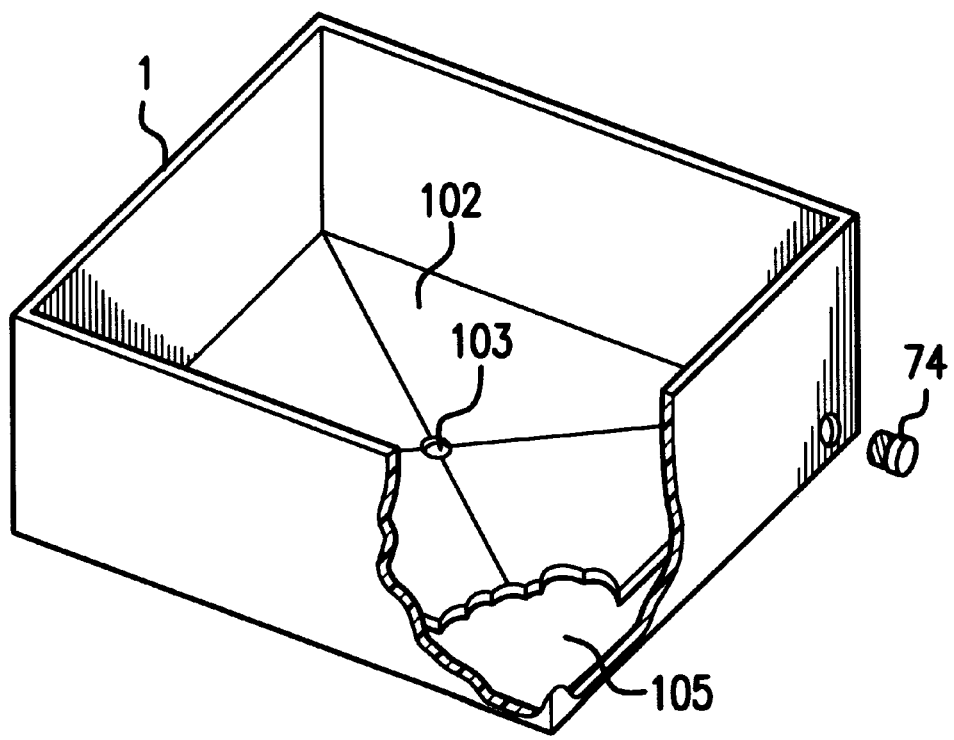
FIG. 2B shows the special fitter-tray with double bottom to collect excreta and the nozzle to discharge the excreta in accordance with one embodiment of this invention.

With reference to FIG. 2B, the device of this invention comprises litter-tray containing box 1 having a slightly sloping double-bottom 102 which directs the flow toward the waste duct 103 of the excreta collected in the bottom section 105, and a bottom section discharging hole and the relevant sealing plug 74.

Figure 2C:
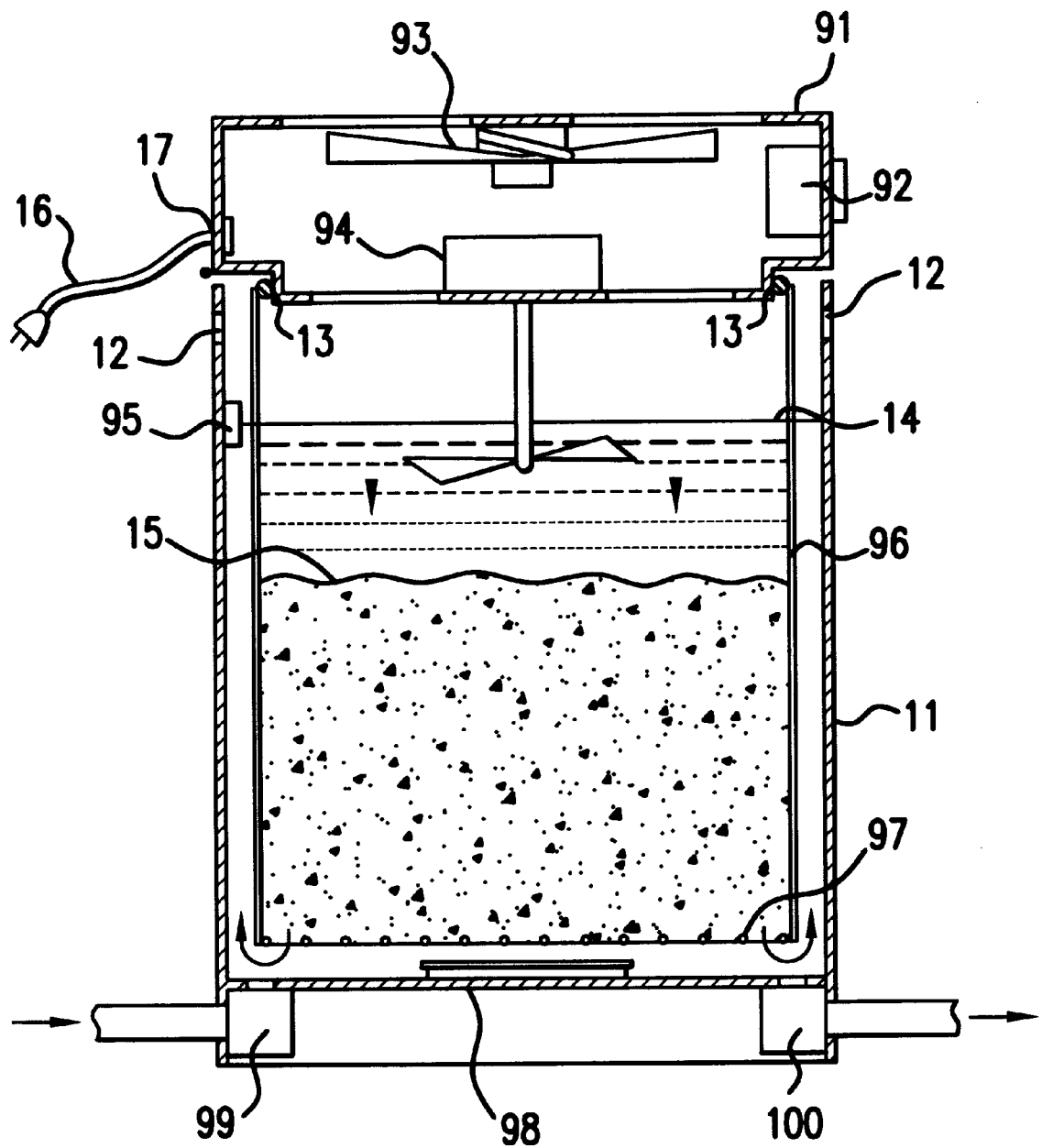
FIG. 2C shows a cross-section view of a granule washing machine for a litter-tray in accordance with one embodiment of this invention.
Figure 2D:
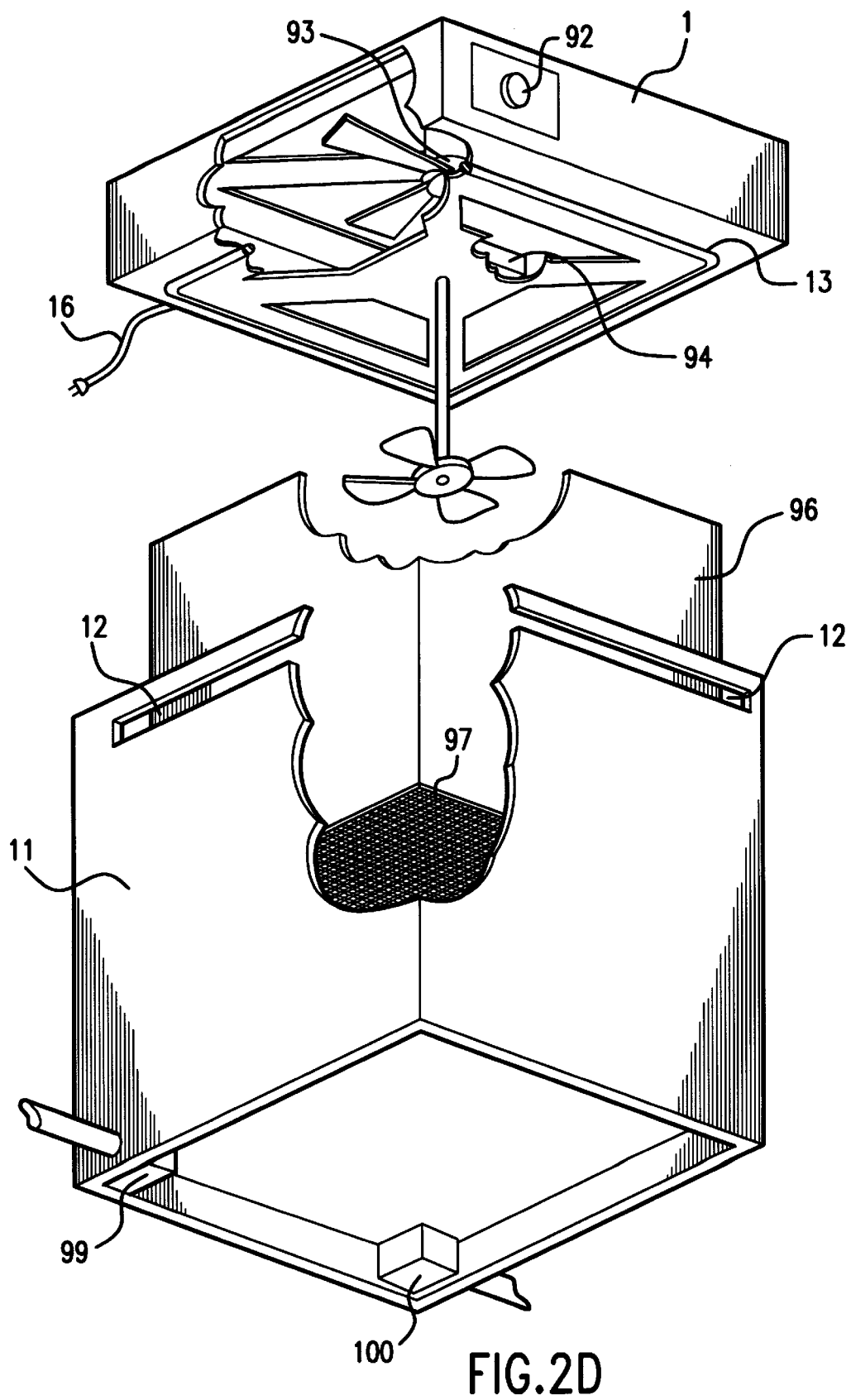
FIG. 2D is an exploded perspective view of the granule washing machine shown in FIG. 2C.

FIG. 2C shows a granule washing machine for a litter-tray in accordance with one embodiment of this invention comprising a washing machine cover frame 91, a starting and programming board 92, a heater fan for the granule drying 93, an electrical blade stirrer to stir the bath 94, a water level electrovalve 95, a frame 96 of the perforated bottom inner basket 97, a heating resistance for the bath heating 98, an electrovalve controlling the inlet of the hot water 99, an electropump 100 for emptying the washing machine, an external frame 11 of the washing machine, exhaust ducts 12 for the drying air forced by the heater fan, and sealing gaskets 13 compelling air to exit through the perforated bottom 97 and then through the exhaust ducts 12. Reference numeral 14 indicates the water level; reference numeral 15 is the granule level; reference numeral 16 is the connection to the power supply; and reference numeral 17 is the safety fuse.

Figure 3:
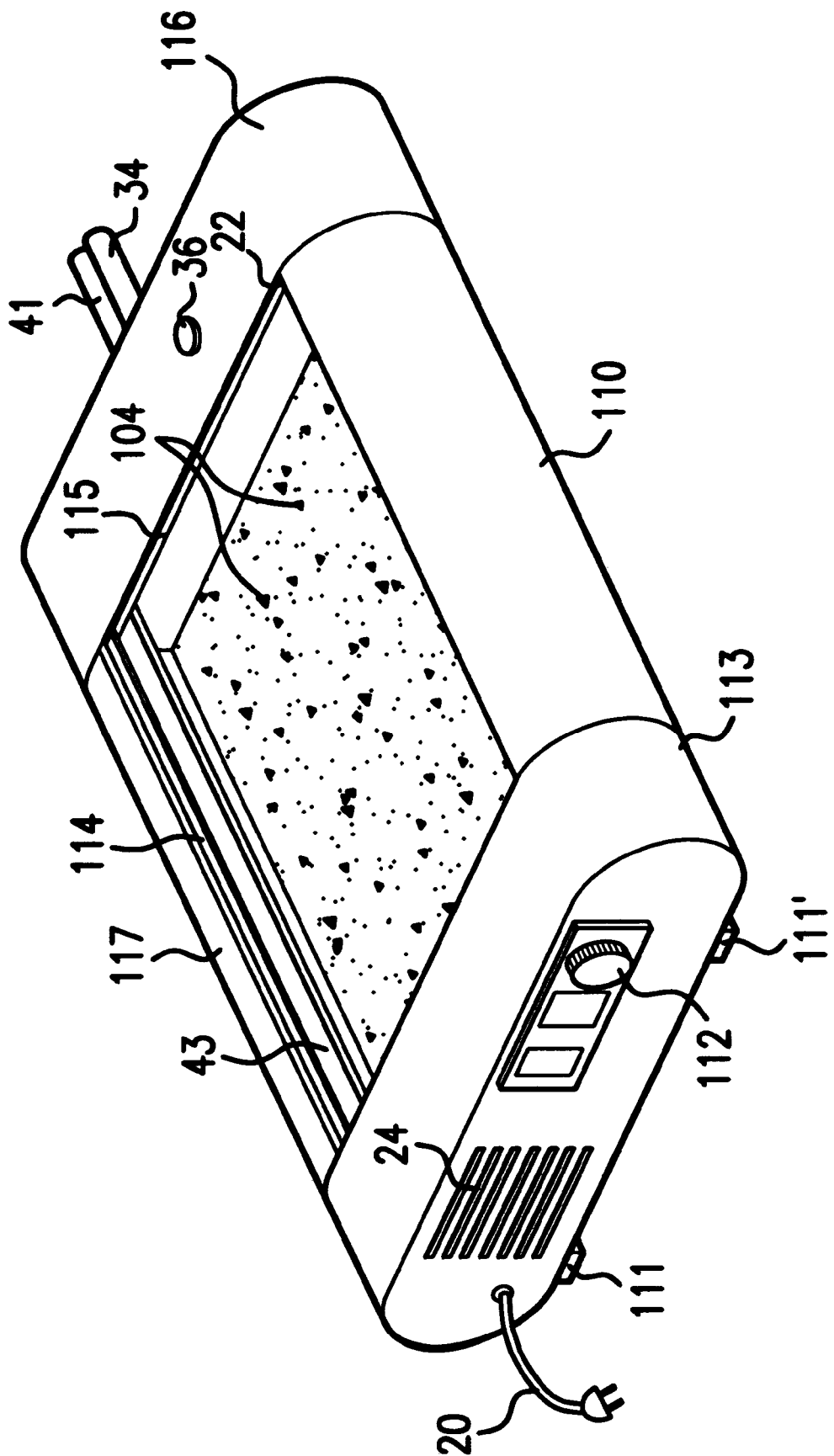
FIG. 3 shows a perspective view of the litter-tray open for the collection and disposal of cat excreta, according to the automatic embodiment of the present invention.
Figure 4:
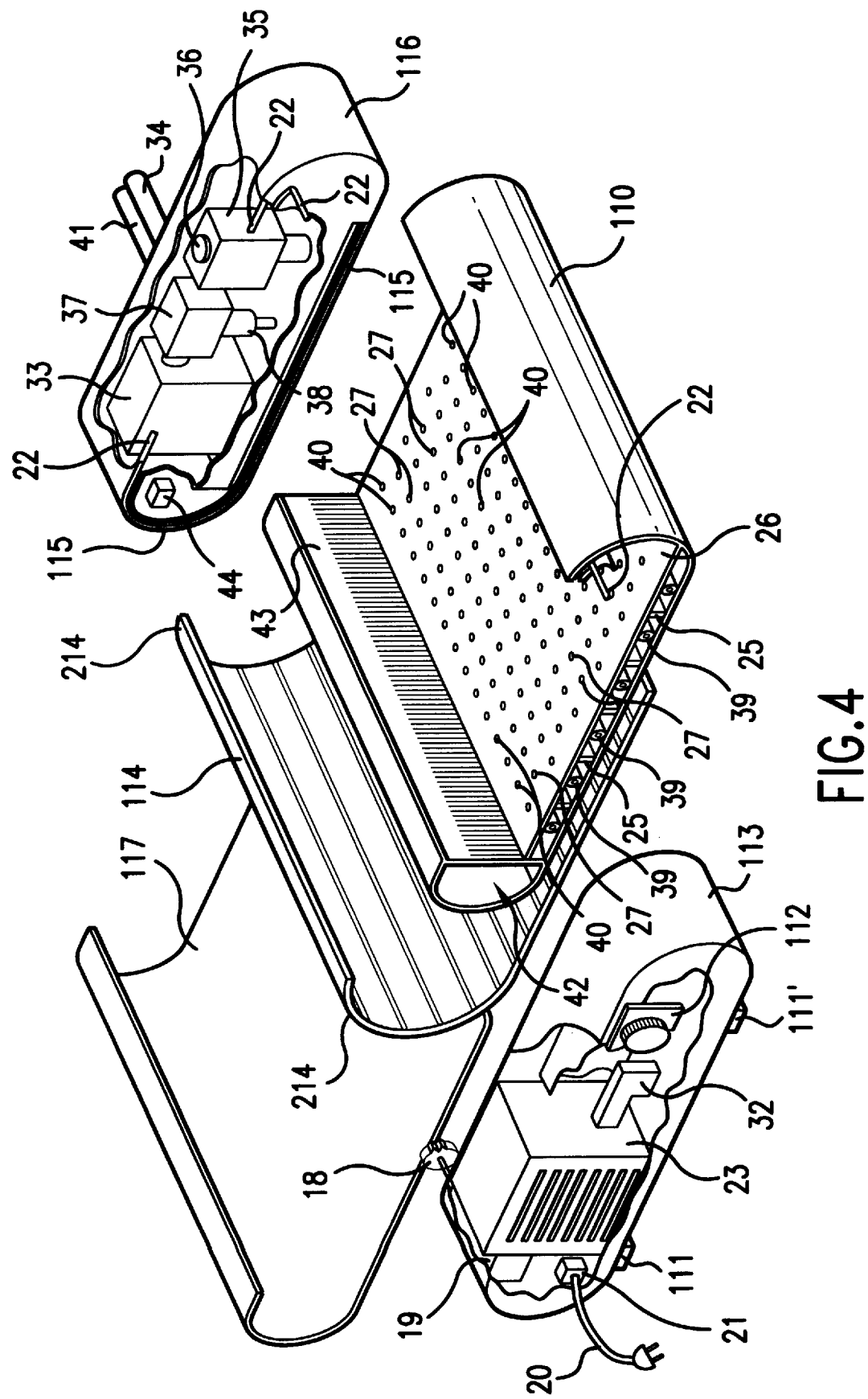
FIG. 4 shows an exploded perspective view of the litter-tray of FIG. 3.

With reference to FIGS. 3 and 4, the tray or open box 110, containing the granules 104, is mounted on four supporting legs 111 (only two are shown) of which the leg 111 is also a sensor for the presence of the cat. The cat-sensor is connected by means of a delay-timer (not shown) to a programmer 112 hermetically sealed into the side 113 of the tray 110 which programmer 112 controls the timing of the various operations which make up the automation of the litter-tray, in particular the hermetic sealing and re-opening of the tray 110 by the moving articulated cover 114, whose sides 214 run in two lateral guide-ways 115 (only one can be seen) in the opposing walls of sides 113 and 116 of the tray 110 to seal the tray. The moving cover 114 is guided by an external guide-wall 117 and is moved by a friction roller 18 driven by an electric motor 19 connected to the mains by a plug-lead 20 which projects from the side 113 and the fuse 21. The hermetic seal is achieved by the inflation, controlled by the programmer 112, of a hollow perimeter gasket 22 fitted to the edges of the tray 110 and the sides 113 and 116 by the electric fan 23 mounted in the side 113 whose main function is supplying drying air for as long as the programmer 112 determines. The air is drawn in through the intake 24, blown along the air-galleries 25 in the base 26 of the tray 110, through the nozzles 27 supported on the base 26 (see specifically FIG. 4) and into the interior of the tray 110 against the layer of granules therein contained.

Figure 5:
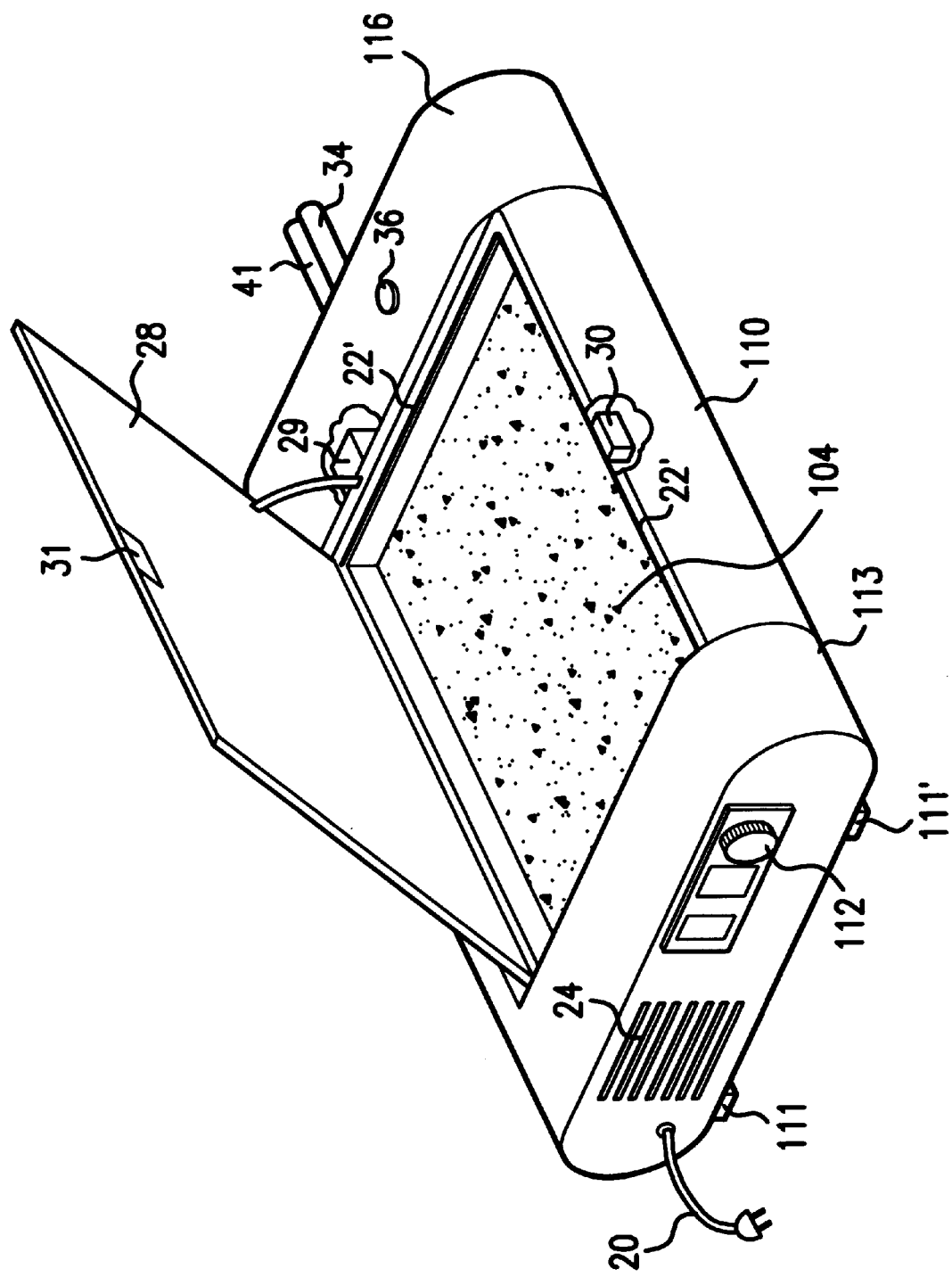
FIG. 5 shows a perspective view of the litter-tray for the collection and disposal of cat excreta, according to one embodiment of the present invention.

In accordance with one embodiment of the present invention shown in FIG. 5, the hermetic sealing or re-opening of the tray 110 is effected by a rigid cover 28 hinged to one of the sides of the tray 110 being rotated respectively against or away from a perimeter gasket 22' on the edge of the tray by an electric or pneumatic actuator 29 between the tray 110 and the cover 28. The hermetic seal is maintained by an electromagnet 30 mounted in the tray 110 interacting with a metal plate 31 on the cover 28.

At least one heating element 32 is provided within the side 113 to heat the drying air to the temperature preset on the air-thermostat by the programmer 112, while there is provision within side 116 for housing an electric pump 33 (see FIG. 4) to circulate water drawn from the mains inlet 34 through the detergent reservoir 35, whose filler-cap projects from side 116, and into the electro-valve 37. At least one heating element 38 is provided to heat the washing-water to the temperature preset on the water-thermostat by the programmer 112. The washing-water is pumped by the electric pump 33 along the water-galleries 39 in the base 26 of the tray; 110, through the nozzles 40 supported on the base 26 (see specifically FIG. 4) and into the interior of the said tray 110 and from there to the dirty water waste-pipe 41.

The tray 110 is provided with a hopper 42 which communicates with the interior of the tray 110 through a hatch 43 controlled by the programmer 112. There is also a level sensor 44 for the water which floats the solid cat-excreta off the granules 104, the sensor being higher than the layer of granules 104 and at about the same level as the lower edge of the hatch 43. The said hopper 42 is also provided with rotating blades 45 driven by the electric motor 46 (see FIG. 6) to chop up the solid excreta. The motor 46 also drives a rotating roller 47 set at the lower edge of the hatch 43 which facilitates the entry into the said hopper 42 of the solid excreta previously separated from the granules 104.

Figure 6:
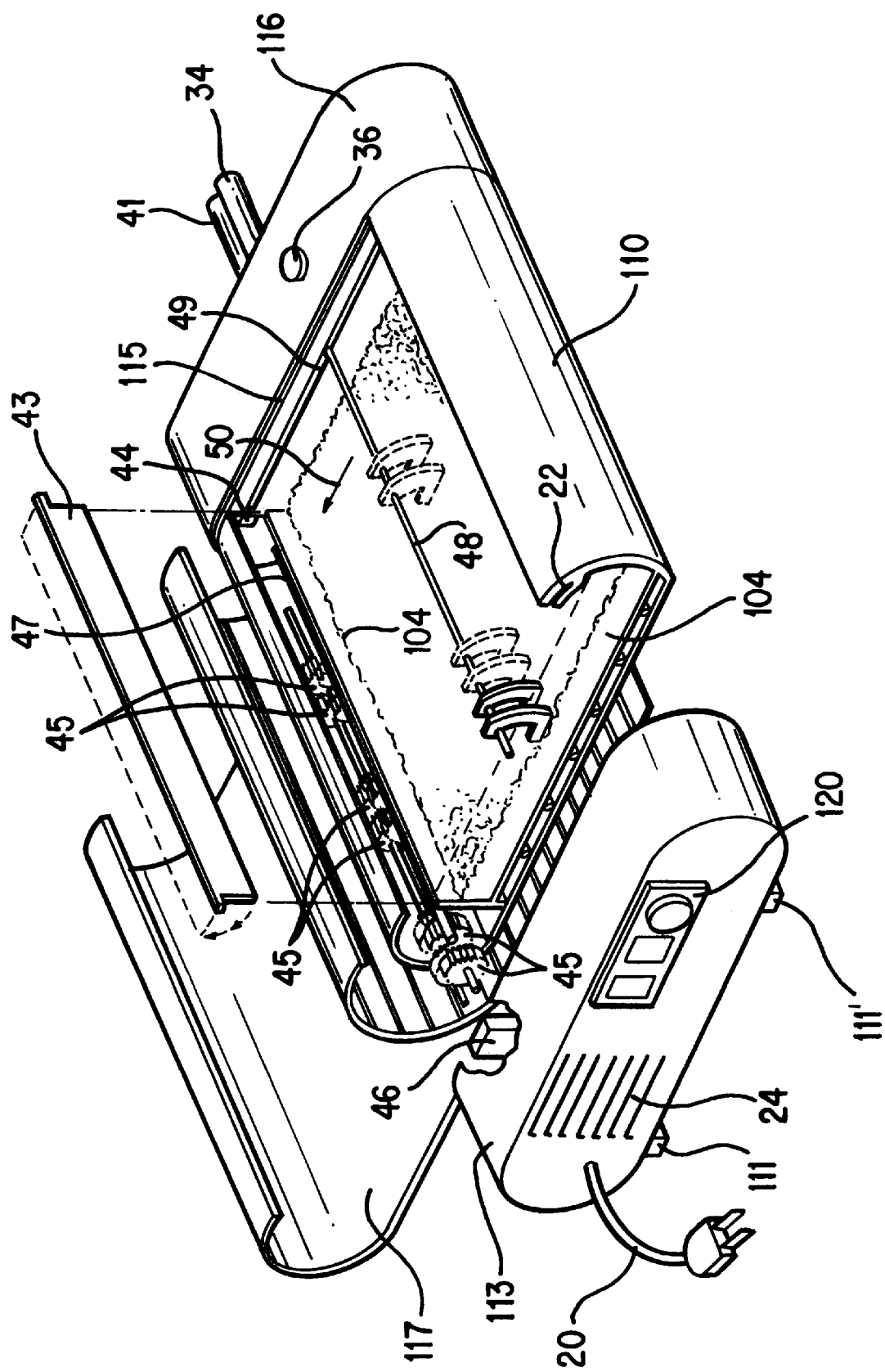
FIG. 6 shows an exploded perspective view of the litter-tray of FIG. 3 according to one embodiment of the present invention comprising a hopper, a level-sensor and an excreta-removing spatula or rake.

In accordance with one embodiment of the invention as illustrated in FIG. 6, the tray 110 is provided with a spatula or rake 48 at the level of the level-sensor 44 which extends across the full width of the tray 110 and is moved along lateral guides 49 on the opposing walls of sides 113 and 116 of the tray 110 at the same level as the level-sensor 44 by a pneumatic cylinder, electric motor or electromagnet (not shown) across the entire surface of the flotation water in the direction of the arrow 50 until it reaches the edge of the hopper 42 into which it pushes any floating solid excreta.

Figure 7:
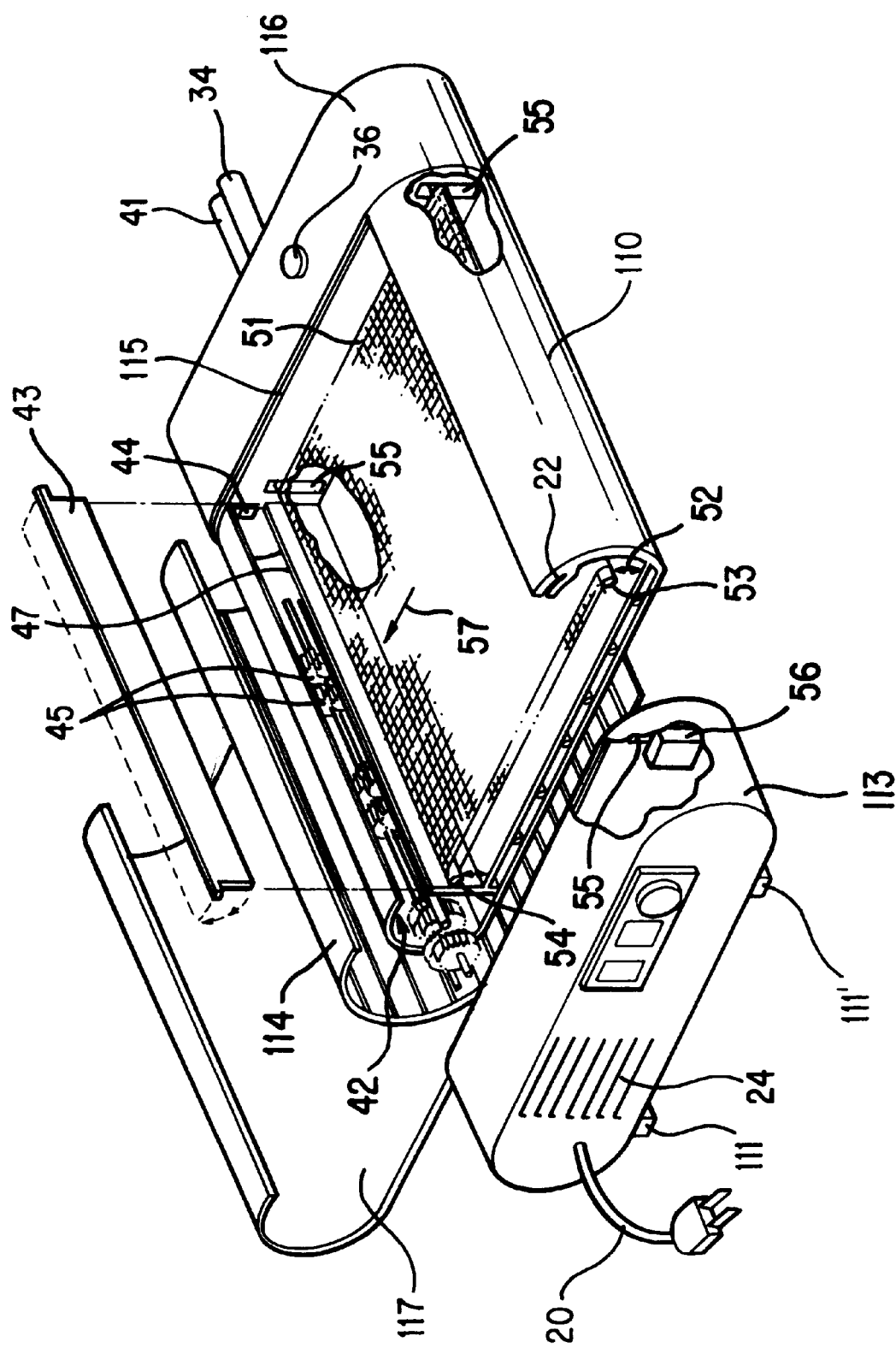
FIG. 7 shows an exploded perspective view of the litter-tray of FIG. 3 according to one embodiment of the present invention comprising a flexible grille acting in the manner of an endless conveyor belt.

In accordance with another embodiment of the invention as illustrated in FIG. 7, to separate the solid excreta from the granules 104, the tray 110 is provided with a grille 51 of the same size as the tray 110 and with larger mesh than the grain-size of the granules, which is moved vertically by a pneumatic piston 52 controlled by the programmer 112, from a position of being buried within the layer of granules to a position external to the layer. The grille 51 (which may be rigid and may be vibrated in the direction of the hopper 42) is in this specific case flexible and supported in the manner of an endless conveyor belt by two small-diameter bearing rollers 53 and 54 disposed horizontally in line with the two sides of the tray containing the hopper 42 (see FIG. 7) and whose axle-ends rotate in slots 55 in the opposing walls of sides 113 and 116 of the tray 1'. The driving roller 53 is driven by an electric motor 56 so as to move the flexible grille 51 in the direction of the arrow 57 towards the hopper 42.

The completely automatic mode of operation of a litter-tray in accordance with one embodiment of this invention is now evident.

After the sensor-leg 111' has signaled the departure of the cat, the programmer 112 starts the cleaning cycle comprising the hermetic sealing of the, tray 110 by the moving cover 114 or 28, the washing with hot water, the activating of the electric pump 33 for the pre-set time subject to the addition of detergent to the reservoir 35, the effecting of the drying cycle for the pre-set time, the activation of the electric fan 23 and finally re-opening of the tray 110.

What is claimed is:

1. In a litter-tray for the collection and disposal of cat excreta comprising a tray or open box 110 in which a layer of granules 104 is deposited, a sensor (111') for detecting a presence of a cat, said sensor being connected through a delay-timer to a programmer 112, a door mechanism (114, 28) fitted with a means of hermetic sealing and re-opening of the tray (110) under the control of said programmer (112), a water inlet for providing water on said layer of granules (104) for a length of time determined by said programmer (112) and an air heating element (32) for heating drying air, the improvement comprising: a detergent reservoir (35), a water heating element (38) to heat water to a temperature preset on a water-thermostat by said programmer (112), and an electric pump (33) to circulate heated water along a plurality of water galleries (39) and spray it in the form of strong jets onto said layer of granules (104) through a plurality of nozzles (23) supported on the base of the said tray (110).

2. A litter-tray for the collection and disposal of cat excreta in accordance with claim 1, wherein the means of hermetically sealing and re-opening said tray (110) comprises two opposing lateral guides (115) on the tray (110), in which run the side edges (214) of a moving cover 114 which is articulated and is operated by a friction roller (18) driven by an electric motor (19), and a hollow elastic perimeter gasket (22), which is inflated by the said electric fan (23) controlled by said programmer (112), fitted to the rim of the tray (110).

3. A litter-tray for the collection and disposal of cat excreta in accordance with claim 1, wherein said means of hermetically sealing and re-opening the tray (110) comprises one of an electric and a pneumatic actuator (29) linking the tray and a cover in such a way as, on a command of the programmer (112), to rotate the cover (28) about a hinged edge connecting it to said tray against at least one perimeter sealing gasket (22') on the rim of the same tray, the hermetic seal being maintained by at least one electromagnet (30) in the tray acting on at least one metal plate (31) in the cover (28).

4. A litter-tray for the collection and disposal of cat excreta in accordance with claim 1, wherein the tray (110) is fitted with a hopper (42) having a plurality of rotating mincing blades (45) driven by an electric motor (46) to chop up solid excreta separated from the granules by a means of separation, a hatch (43) opened by the programmer (112) which provides access to said hopper (42) as well as to a rotating roller (47) which, located at the lower end of the hatch (43) is driven by said electric motor (46) in such a way as to help to push the solid excreta into the hopper (42).

5. A litter-tray for the collection and disposal of cat excreta in accordance with claim 4, wherein said means of separation comprises a level-sensor (44) for floatation water inside the tray (110), located higher than the granules at about a height of said hatch (43) of the hopper.

6. A litter-tray for the collection and disposal of cat excreta in accordance with claim 4, wherein flotation water for separation of said solid excreta from said granules comprises at least one salt un solution.

7. A litter-tray for the collection and disposal of cat excreta in accordance with claim 4, wherein the tray is fitted with a spatula or rake (48) at a same level as a level sensor (44) which is as wide as said tray and is moved in guide-rails (49) in the tray by a pneumatic cylinder across an entire surface of flotation water to the edge of the hopper (42).

8. A litter-tray for the collection and disposal of cat excreta in accordance with claim 4, wherein the tray is fitted with a spatula or rake (48) at a same level as a level sensor which is as wide as said tray and is moved in guide-rails (49) in the tray by an electric motor across an entire surface of flotation water to the edge of the hopper (42).

9. A litter-tray for the collection and disposal of cat excreta in accordance with claim 4, wherein the tray being fitted with a spatula or rake (48) at a same level as a level sensor which is as wide as said tray and is moved in guide-rails (49) in the tray by an electromagnet across an entire surface of flotation water to the edge of the hopper (42).

10. A litter-tray for the collection and disposal of cat excreta in accordance with claim 4, wherein the means of separation of the solid excreta from the granules comprises a rigid grille (51) with a larger mesh than the grain-size of the granules fitted with a vibrator causing it to vibrate in a direction of said hopper (42), said grille (51) being capable of being moved vertically by at least one pneumatic cylinder (52) controlled by said programmer (112) from a position of being buried in the granules layer to a position outside said granules layer.

11. A litter-tray for the collection and disposal of cat excreta in accordance with claim 4 further comprising a rigid grille (51) with a larger mesh than the grain-size of the granules and fitted with a vibrator causing it to vibrate in a direction of said hopper (42), said grille being capable of being moved vertically by at least one electromagnet controlled by said programmer (112) from a position of being buried in the layer of granules to a position outside said layer of granules.

12. A litter-tray for the collection and disposal of cat excreta in accordance with claim 4, wherein said means of separation of the solid excreta from the granules comprises a flexible grille (51) with a larger mesh than the grain-size of the granules in a form of an endless conveyor belt fitted over two small-diameter rollers (53, 54) set horizontally at the two ends of the tray involved with said hopper (42), one of said rollers (53) being rotated towards said hopper (42) by an electric motor (56) controlled by said programmer (112) and the roller-grille system (51, 53, 54) being capable of being moved vertically by at least one pneumatic cylinder (52) controlled by said programmer (112) from a position of being buried in the layer of granules to a position outside said layer of granules.

13. A litter-tray for the collection and disposal of cat excreta in accordance with claim 4, wherein said means of separation of the solid excreta from the granules comprises a flexible grille (51) with a larger mesh than the grain-size of the granules in a form of an endless conveyor belt fitted over two small diameter rollers (53, 54) set horizontally at the two ends of the tray involved with said hopper (42), one of said rollers (53) being rotated towards said hopper by an electric motor (56) controlled by said programmer (112) and the roller-grille system (51, 53, 54) being capable of being moved vertically by at least one electromagnet controlled by said programmer (112) from a position of being buried in the layer of granules to a position outside said layer of granules.

14. A litter-tray for the collection and disposal of cat excreta in accordance with claim 1 further comprising a blower system (23) for removal of odors and sludge.

15. A litter-tray for the collection and disposal of cat excreta in accordance with claim 1 further comprising an additional tank as a chemical waste disposal connected to a waste-pipe.

16. A litter-tray for the collection and disposal of cat excreta in accordance with claim 1, wherein said litter-tray is covered by sound-damping material.

17. A litter-tray for the collection and disposal of cat excreta in accordance with claim 1 further comprising an ultra-sound generator to clean said granules.

18. A litter-tray for the collection and disposal of cat excreta in accordance with claim 1 further comprising a micro-wave generator to clean the said granules.

* * * * *